US009326114B2

(12) United States Patent
Lazaridis et al.

(10) Patent No.: US 9,326,114 B2
(45) Date of Patent: Apr. 26, 2016

(54) TRANSFERRING A VOICE CALL (75) Inventors: Mihal Lazaridis, Waterloo (CA); George Ross Staikos, Toronto (CA); Mark E. Pecen, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 47 days.

(21) Appl. No.: 14/131,245

(22) PCT Filed: Jul. 14, 2011

(86) PCT No.: PCT/US2011/044043
§ 371 (c)(1),
(2), (4) Date: Jan. 7, 2014

(87) PCT Pub. No.: WO2013/009319
PCT Pub. Date: Jan. 17, 2013

(65) Prior Publication Data
US 2014/0155033 A1    Jun. 5, 2014

(51) Int. Cl.
*H04M 1/725* (2006.01)
*H04W 4/16* (2009.01)
*H04M 1/60* (2006.01)

(52) U.S. Cl.
CPC .............. *H04W 4/16* (2013.01); *H04M 1/6091* (2013.01); *H04M 1/7253* (2013.01)

(58) Field of Classification Search
CPC .............. H04M 1/7253; H04M 1/609; H04M 1/72527; H04M 3/54; H04M 1/6075; H04W 4/16; H04W 4/008; H04W 88/04; G06F 13/385
See application file for complete search history.

(56) References Cited

U.S. PATENT DOCUMENTS

| | | | |
|---|---|---|---|
| 6,772,331 B1 * | 8/2004 | Hind et al. | 713/151 |
| 8,180,399 B1 * | 5/2012 | Katzer et al. | 455/557 |
| 2002/0068575 A1 | 6/2002 | Agrawal et al. | |
| 2002/0172185 A1 * | 11/2002 | Mito et al. | 370/347 |
| 2006/0097855 A1 | 5/2006 | Turnbull | |
| 2006/0212938 A1 | 9/2006 | Suzuki | |
| 2008/0207124 A1 | 8/2008 | Raisanen et al. | |
| 2009/0170483 A1 | 7/2009 | Barnett et al. | |
| 2009/0248913 A1 | 10/2009 | Salokannel | |
| 2009/0325491 A1 | 12/2009 | Bell et al. | |
| 2010/0045441 A1 * | 2/2010 | Hirsch et al. | 340/10.1 |
| 2010/0222045 A1 | 9/2010 | Bexell | |
| 2011/0070825 A1 | 3/2011 | Griffin et al. | |
| 2013/0017780 A1 | 1/2013 | Rose et al. | |

OTHER PUBLICATIONS

International Preliminary Report on Patentability under Chapter I issued in International Application No. PCT/US2011/044043 on Jan. 23, 2014; 5 pages.

(Continued)

*Primary Examiner* — Kashif Siddiqui
*Assistant Examiner* — Minjung Kim
(74) *Attorney, Agent, or Firm* — Fish & Richardson P.C.

(57) ABSTRACT

Methods, systems, and computer programs for transferring a call described. In some aspects, during a voice call, a mobile device detects proximity of an audio appliance. The mobile device determines that the audio appliance is permitted to carry an audio portion of the voice call. The mobile device establishes a bi-directional communication link operable to transfer audio data between the mobile device and the audio appliance. In some instances, the audio data for the voice call is routed between the mobile device and the audio appliance by the bi-directional communication link.

29 Claims, 3 Drawing Sheets

(56) References Cited

OTHER PUBLICATIONS

Wikipedia, Bluetooth, URL: http://en.wikipedia.org/wiki/Bluetooth, 24 pages, dated Jun. 22, 2011.
Wikipedia, Near Field Communication, URL: http://en.wikipedia.org/wiki/Near_Field_Communication, 19 pages, dated Jun. 22, 2011.
NFC Forum, Connection Handover, Technical Specification—Connection Handover 1.2, 27 pages, dated Jul. 7, 2010.
NFC Forum, NFC Activity Specification, Technical Specification—Activity 1.0, 117 pages, dated Nov. 18, 2010.
International Search Report and Written Opinion of the International Searching Authority issued in International Application No. PCT/US2011/044043 on Jan. 24, 2012; 7 pages.

* cited by examiner

TRANSFERRING A VOICE CALL

CLAIM OF PRIORITY

This application is a U.S. National Stage of International Application No. PCT/US2011/044043 filed on Jul. 14, 2011, the entire content of which is hereby incorporated by reference.

BACKGROUND

This specification relates to transferring a voice call.

Some mobile devices include short-range wireless interfaces that can communicate wirelessly with two-way audio devices. For example, some smartphones include Bluetooth technology that can be used to pair the smartphone to a Bluetooth-enabled headset or speakerphone. The paired headset or speakerphone can then be used to conduct a call carried by the mobile device.

BRIEF DESCRIPTION OF THE DRAWINGS

Like reference numbers and designations in the various drawings indicate like elements.

DETAILED DESCRIPTION

In some implementations, the audio portion of an ongoing voice call can be transferred, or handed over, from a mobile device to a speakerphone or another two-way audio device. Examples of other types of two-way audio devices include stereo audio entertainment devices, computers having audio capabilities, another mobile device capable of performing a two-way voice call, etc. The handover may be performed, for example, by a Near Field Communication (NFC) module or another type of signaling subsystem. Some example signaling subsystems include radio frequency subsystems, optical subsystems, infrared subsystems, etc. The signaling subsystem can establish a data path for audio data to be transferred between the mobile device and the two-way audio device. The data path can include a short-range communication subsystem. Some examples short-range communication subsystems include Bluetooth subsystems, 60 GHz subsystems, free-space infra-red or visible light optical subsystems, etc. In some cases, the short-range communication subsystem provides a faster data transfer mechanism than the signaling subsystem. In some cases, the short-range communication subsystem can be used to perform some or all of the signaling operations.

In some aspects of operation, a user places or receives a voice call on a mobile terminal, and wishes to transfer the call to a nearby audio appliance, such as, for example, a properly-equipped speaker phone. The user places the mobile terminal within proper proximity of the audio appliance to exchange signaling information. The signaling information exchanged may include a device identifier, a user identity, cryptographic certificates, authentication challenge/response information, or other information needed to satisfy both pieces of equipment that the other is permitted to engage in an audio session handover. The mobile terminal and the audio appliance can set up a bi-directional communication path between both devices so that the audio can be carried by the audio appliance. In some cases, upon termination of the call by either party, the bi-directional audio link can be removed and both the mobile terminal and the audio appliance can then operate independently.

One example platform for proximity-based communication is provided by Near Field Communication (NFC) technology. Other types of proximity-based communication technologies may be used. In some implementations, NFC technology enables data exchange between devices at a distance of approximately four to ten centimeters, at rates of approximately 100 kbps. NFC-enabled devices can be made to transfer information between devices by simply placing them near each other. For example, "tapping" or otherwise bringing two NFC-enabled device within range of each other may cause one or both of the devices to send a message to the other device.

Some NFC-enabled devices include passive components. For example, some NFC tags operate passively, utilizing power received wirelessly from an active NFC device. Accordingly, some NFC devices can operate in a listening mode or another passive mode of operation. An NFC device operating in a listening mode can receive wireless signals transmitted by other NFC devices. The listening NFC device can respond by transmitting a signal that allows the other NFC device to detect proximity of the listening NFC device. The response can be generated based on energy extracted from the signal received by the listening NFC device, energy stored at the listening NFC device, or energy from other sources.

Some NFC-enabled devices include active components. For example, some NFC devices have an internal power source or they can be integrated into a device or system (e.g., a smartphone, a tablet, a speakerphone, a computer, a vehicle, etc.) having an internal power source. Such active devices can operate in a listening mode as outlined above. Additionally or alternatively, an active NFC device can operate in a polling mode. An NFC device operating in a polling made can send periodic polling signals or other interrogation messages that allow other NFC devices to detect proximity of the polling NFC device. The polling NFC device can detect proximity of other NFC devices, for example, when the other NFC devices respond to the polling signal.

NFC-enabled devices can communicate with each other wirelessly by electromagnetic signals. For example, some currently available NFC-enable devices utilize radio frequency signals at or near 13.56 MHz. Whether two NFC-enabled devices detect proximity of each other can be a function of the effective range of their NFC modules and other factors. In various contexts, the effective range at which NFC modules can detect each other may depend, for example, on the power and frequency of the signals transmitted, the transmission environment, the orientation of the devices, and other considerations. For example, a listening NFC device may detect proximity of a polling NFC device when the listening NFC device receives a signal having a signal-to-noise ratio greater than a threshold level. Similarly, a polling NFC device may detect proximity of another device when the polling NFC device receives a signal having a signal-to-noise ratio greater than a threshold level. Different NFC devices may have different effective ranges, and they may have different thresholds for detecting proximity of other devices. Moreover, proximity can be detected based on additional or different criteria. In some examples, NFC-enabled devices are configured to detect proximity of other NFC-enabled devices within a range of about four to ten centimeters. NFC-enabled devices can potentially be configured to detect NFC-enabled devices, or other types of devices, in a different range.

Figure 1:
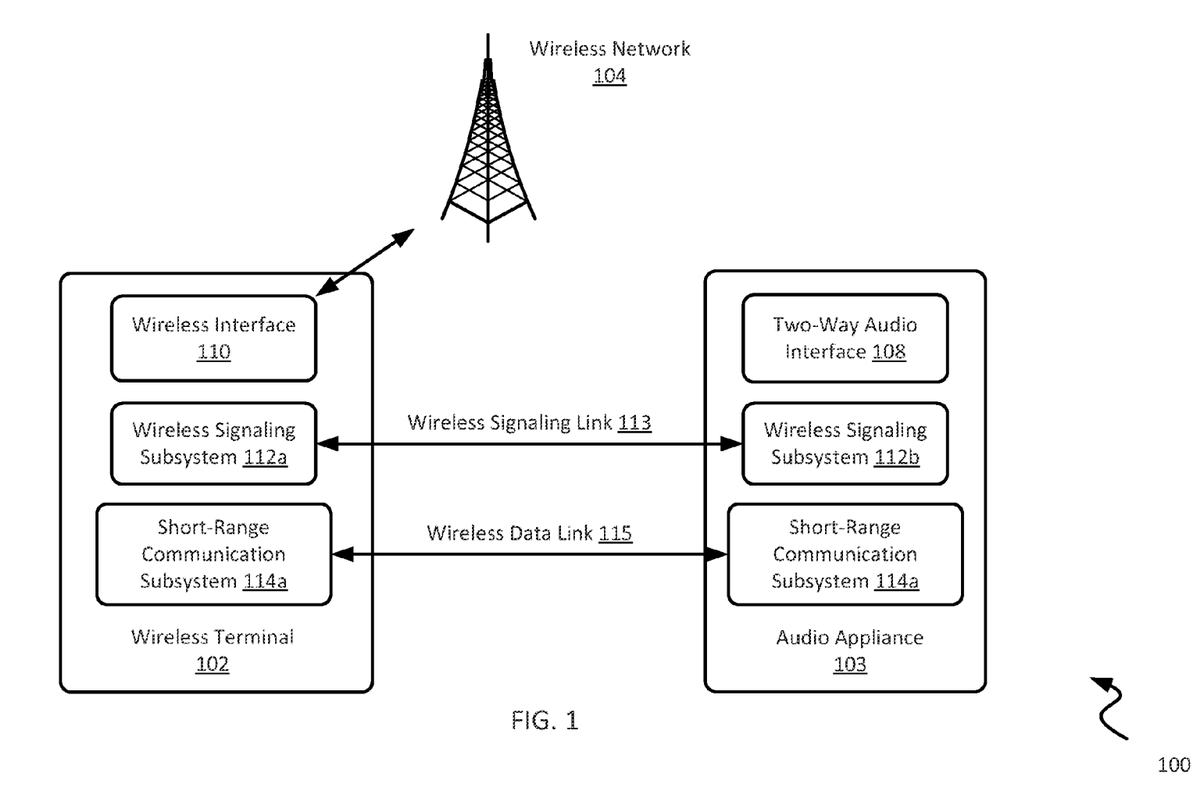
FIG. 1 is a schematic diagram of an example communication system.

FIG. 1 is a schematic diagram of an example communication system 100. The example communication system 100 includes a wireless terminal 102, an audio appliance 103, and a wireless network 104. The communication system 100 can include additional or different features and components. For example, the communication system 100 can include one or more servers, computing systems, additional or different networks, wireless terminals, or appliances, or any suitable combination of these other components. In the example shown in FIG. 1, the wireless terminal 102 can communicate with the audio appliance 103 by a wireless signaling link 113, by a wireless data link 115, or any suitable combination of these and other links or connections between the wireless terminal 102 and the audio appliance 103. The components of the communication system 100 can be configured as shown in FIG. 1, or the communication system 100 can be configured in another manner, as appropriate.

The example wireless network 104 shown in FIG. 1 can include one or more wireless telecommunication networks, wireless data networks, combined voice and data networks, or any suitable combination of these and other types of wireless networks. The wireless network 104 can communicate with the wireless terminal 102, for example, by radio frequency signals or another mode of communication. The wireless network 104 can include one or more local, regional, national, and/or global networks. The wireless network 104 can include one or more cellular networks. For example, a cellular network can include one or more base stations, radio antennas, and other subsystems and infrastructure. The wireless network 104 may utilize one or more communication protocol standards, for example, 3G, 4G, GSM, LTE, CDMA, GPRS, EDGE, LTE, or others.

Figure 2:
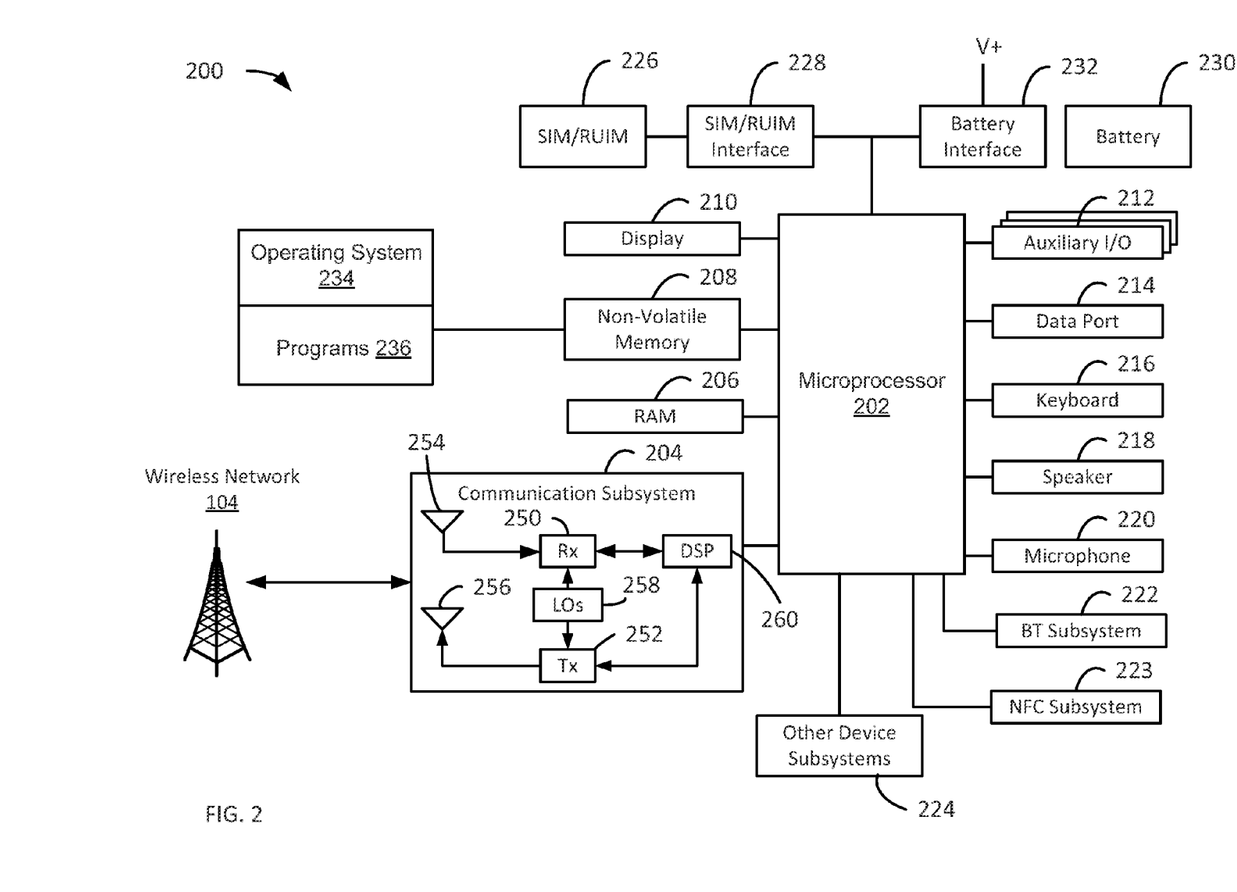
FIG. 2 is a schematic diagram of an example wireless terminal.

The example wireless terminal 102 shown in FIG. 1 includes a wireless interface 110, a wireless signaling subsystem 112a, and a short-range communication subsystem 114a. The wireless terminal 102 may include additional or different features and components. The features and components of the wireless terminal 102 can be configured as shown and described with respect to FIG. 1 or in a different manner. Generally, the wireless terminal 102 can include any appropriate types of subsystems, modules, devices, components, and combinations thereof. Examples of wireless terminals include various types of mobile telecommunication devices, smartphones, laptop systems, tablet devices, etc. An example wireless terminal 200 is shown in FIG. 2.

The wireless interface 110 of the wireless terminal 102 can include any suitable hardware, software, firmware, or combinations thereof. In some implementations, the wireless interface 110 can be included in a wireless communication subsystem of the wireless terminal 102 (such as, for example, the communication subsystem 204 of the wireless terminal 200 shown in FIG. 2). The wireless interface 110 may include additional or different features or components. In some implementations, the wireless interface 110 may include or have access to programs, codes, scripts, functions, or other types of instructions that can be executed by data processing apparatus. In some implementations, the wireless interface 110 may include or have access to pre-programmed or re-programmable logic circuits, logic gates, or other types of hardware or firmware components.

The wireless interface 110 handles wireless communications between the wireless terminal 102 and the wireless network 104. In some instances, the wireless interface 110 can transmit and receive data for an ongoing voice call. For example, the wireless interface 110 may wirelessly receive radio frequency signals that include (or can be converted to) audio data (e.g., digital audio data, analog audio data, or a combination), and the audio data can be converted to acoustic information (i.e., sound) by an audio interface (e.g., a speaker, etc.). Similarly, an audio interface (e.g., a microphone, etc.) may receive acoustic information and convert the acoustic information to audio data; and the audio data can be converted to radio frequency signals that are transmitted wirelessly by the wireless interface 110.

The wireless signaling subsystem 112a of the wireless terminal 102 can include any suitable wireless interface. The wireless signaling subsystem 112a may include, for example, a controller, a transceiver, and an antenna in any suitable configuration. In some implementations, the wireless signaling subsystem 112a includes or has access to programs, codes, scripts, functions, or other types of instructions that can be executed by data processing apparatus. In some implementations, the wireless signaling subsystem 112a includes or has access to pre-programmed or re-programmable logic circuits, logic gates, or other types of hardware or firmware components. The wireless signaling subsystem 112a may include additional or different components.

In some implementations, the wireless signaling subsystem 112a is a proximity-activated wireless interface. For example, wireless signaling subsystem 112a can be an NFC interface or another type of proximity-activated wireless interface. Additional or different types of wireless signaling subsystems, proximity-activated or otherwise, may be used. For example, the wireless signaling subsystem 112a can include an infrared communication interface, an optical communication interface, or another type of wireless communication interface.

In some implementations, the wireless signaling subsystem 112a can detect proximity of another suitable device based on wireless interactions with the other device. For example, the wireless signaling subsystem 112a may wirelessly transmit a polling signal or another type of interrogation message, and another device may receive the polling signal and transmit a response that can be detected by wireless signaling subsystem 112a. As such, the wireless signaling subsystem 112a may detect proximity of another device based on the other device's response to a polling signal or another type of interrogation message. As another example, the wireless signaling subsystem 112a may wirelessly receive a polling signal or another type of interrogation message transmitted by another device. As such, the wireless signaling subsystem 112a may detect proximity of another device based on a polling signal or other type of interrogation message transmitted by the other device.

The wireless signaling subsystem 112a or another component of the wireless terminal 102 may detect proximity of another device based on additional or different techniques. For example, the wireless terminal 102 may include an accelerometer, a directional coupler, or a combination of these and other components that enhance proximity-detection features of the wireless terminal 102. In some instances, the wireless terminal 102 can detect proximity of another device based on physical contact between the wireless terminal 102 and the other device. For example, the wireless terminal 102 may include sensors or modules that detect proximity based on non-conductive contact (e.g., "tapping"), conductive contact (e.g., wires or leads), or another type of conductive or non-conductive contact with another device.

In some implementations, the wireless signaling subsystem 112a can exchange signaling information with another device (e.g., with the audio appliance 103). For example, the wireless signaling subsystem 112a may receive signaling information that allows the wireless terminal 102 to determine whether the audio appliance 103 is permitted to carry an audio portion of an ongoing call; and the wireless signaling subsystem 112a may transmit signaling information that allows the audio appliance 103 to determine whether the wireless terminal 102 is permitted to transfer an audio portion of an ongoing call. In some implementations, the signaling information can include an identifier for the mobile device, an identifier for a user associated with the mobile device, a cryptographic certificate, or authentication challenge/response information.

In some implementations, the wireless signaling subsystem 112a can exchange call handover information with another device (e.g., with the audio appliance 103). For example, the wireless signaling subsystem 112a may execute a handover sequence that establishes the wireless data link 115. The handover can be executed based on a standard or another type of handover protocol. In some instances, the handover sequence executed by the wireless signaling subsystem 112a may include a handover request message, a handover select message, and any additional or different information needed to establish an alternative data carrier between the wireless terminal 102 and another device.

The short-range communication subsystem 114a of the wireless terminal 102 can include any suitable wireless interface. The short-range communication subsystem 114a may include, for example, a controller, a transceiver, and an antenna in any suitable configuration. In some implementations, the short-range communication subsystem 114a includes or has access to programs, codes, scripts, functions, or other types of instructions that can be executed by data processing apparatus. In some implementations, the short-range communication subsystem 114a includes or has access to pre-programmed or re-programmable logic circuits, logic gates, or other types of hardware or firmware components. The short-range communication subsystem 114a may include additional or different components.

In some implementations, the short-range communication subsystem 114a is a high-speed wireless interface. For example, the short-range communication subsystem 114a can include a Bluetooth interface, a WiFi interface, or another type of high-speed wireless interface. Additional or different types of short-range communication subsystems may be used. For example, the wireless signaling subsystem 112a can include an infrared communication interface, an optical communication interface, a 60 GHz wireless communication interface, or another type of wireless communication interface.

In some implementations, the short-range communication subsystem 114a can exchange audio data with another device (e.g., with the audio appliance 103). For example, in some instances, the short-range communication subsystem 114a receives incoming audio data associated with an ongoing voice call. In particular, the wireless interface 110 may receive the incoming audio data from the wireless network 104 and provide the audio data to the short-range communication subsystem 114a; and the short-range communication subsystem 114a can convert the audio data to an appropriate signal and wirelessly transmit the signal to another device. In some instances, the short-range communication subsystem 114a receives outgoing audio data associated with an ongoing voice call. In particular, the short-range communication subsystem 114a may receive a wireless signal from another device, convert the wireless signal to audio data, and provide the audio data to the wireless interface 110. The wireless interface 110 may convert the audio data to a radio frequency signal and wirelessly transmit the radio frequency signal to the wireless network 104.

The example audio appliance 103 shown in FIG. 1 includes a two-way audio interface 108, a wireless signaling subsystem 112b, and a short-range communication subsystem 114b. The audio appliance 103 may include additional or different features and components. The features and components of the audio appliance 103 can be configured as shown and described with respect to FIG. 1 or in a different manner. Generally, the audio appliance 103 can include any appropriate types of subsystems, modules, devices, components, and combinations thereof. Examples of audio appliances include various types of speakerphone systems, headset devices, laptop computers, desktop computers, installed audio systems, portable audio systems, and others. In some example implementations, the audio appliance can be, or be included in, a desktop teleconference terminal, a stereo system installed in a vehicle, an audio component of a laptop computer, or another type of system.

The two-way audio interface 108 of the audio appliance 103 can include any suitable subsystems, components, devices, and features. In some cases, the audio interface 108 includes a speaker that converts audio data to acoustic information (e.g., sound) and a separate microphone that converts acoustic information to audio data. In some cases, the audio interface 108 includes a combined speaker/microphone component that converts audio data to acoustic information and converts acoustic information to audio data. The speaker and microphone components can be integrated into a common structure, or they may be implemented as multiple separate structures.

The wireless signaling subsystem 112b of the audio appliance 103 can include the same, or substantially the same, features and components as the wireless signaling subsystem 112a of the wireless terminal 102. The wireless signaling subsystem 112b of the audio appliance 103 can include additional or different features and components. In some instances, the wireless signaling subsystem 112b exchanges signals with the wireless signaling subsystem 112a of the wireless terminal 102. For example, the wireless signaling subsystem 112a can wirelessly interact with the wireless signaling subsystem 112b by the wireless signaling link 113.

The wireless signaling link 113 can be implemented by the wireless signaling subsystems 112a, 112b. The wireless signaling link 113 may be implemented by additional or different subsystems, components, or modules. For example, in some cases, some or all aspects of the wireless signaling link 113 can be implemented by one or both of the short-range communication subsystems 114a, 114b. In some implementations, the wireless signaling link 113 includes the interface components, communication protocols, or a combination of these and other features that allow the wireless signaling subsystems 112a, 112b to communicate with each other.

In some implementations, the wireless signaling subsystem 112b can transmit signals enabling another suitable device to detect proximity of the audio appliance 103. For example, the wireless signaling subsystem 112b may wirelessly transmit a polling signal or another type of interrogation message, or the wireless signaling subsystem 112b may transmit a response to another device's polling signal or interrogation message. The wireless signaling subsystem 112b may detect proximity of another device, or allow another device to detect proximity of the audio appliance 103 based on additional or different techniques.

In the example communication system 100 shown in FIG. 1, the wireless terminal 102 can detect proximity of the audio appliance 103 based on wireless interactions between the wireless signaling subsystems 112a, 112b. For example, if the wireless interfaces of the wireless terminal 102 and the audio appliance 103 are brought within a certain distance of each other, one or both of the wireless signaling subsystems 112a, 112b may detect proximity of the other. In some implementations, the wireless terminal 102 can detect proximity of the audio appliance 103 when the devices are brought within about 4 cm, 10 cm, or another distance of each other. In some instances, the conditions under which the wireless terminal 102 can detect proximity of the audio appliance 103 may depend on settings or attributes of the particular devices. For example, proximity may be detected based on receiving signals having a signal-to-noise ratio greater than a threshold level. Moreover, the conditions under which proximity can be detected may depend on the physical orientations of wireless interfaces, physical attributes of their environment, and other considerations.

In some implementations, the wireless signaling subsystem 112b can exchange signaling information with another device (e.g., with the wireless terminal 102). For example, the wireless signaling subsystem 112b may receive signaling information that allows the audio appliance 103 to determine whether the wireless terminal 102 is permitted to transfer an audio portion of an ongoing call; and the wireless signaling subsystem 112b may transmit signaling information that allows the wireless terminal 102 to determine whether the audio appliance 103 is permitted to carry an audio portion of an ongoing call. In some implementations, the wireless signaling subsystem 112b includes or utilizes a display component. For example, the wireless signaling subsystem 112b may display information formatted as a bar code, or another suitable format, and the wireless terminal 102 may include an optical scanner that can read and decode the displayed information.

In some implementations, the wireless signaling subsystem 112b can exchange call handover information with another device (e.g., with the wireless terminal 102). For example, the wireless signaling subsystem 112a may execute a handover sequence that establishes the wireless data link 115.

The short-range communication subsystem 114b of the audio appliance 103 can include the same, or substantially the same, features and components as the short-range communication subsystem 114a of the wireless terminal 102. The short-range communication subsystem 114b of the audio appliance 103 can include additional or different features and components. In some instances, the short-range communication subsystem 114b exchanges signals with the short-range communication subsystem 114a of the wireless terminal 102. For example, the short-range communication subsystem 114a can wirelessly interact with the short-range communication subsystem 114b by the wireless data link 115.

The wireless data link 115 can be implemented by the short-range communications subsystems 114a, 114b. The wireless data link 115 may be implemented by additional or different subsystems, components, or modules. For example, in some cases, some or all aspects of the wireless data link 115 can be implemented by one or both of the wireless signaling subsystems 112a, 112b. In some implementations, the wireless data link 115 includes the interface components, communication protocols, or a combination of these and other features that allow the short-range communication subsystems 114a, 114b to communicate with each other.

In some implementations, the short-range communication subsystem 114b can exchange audio data with another device (e.g., with the wireless terminal 102). In some instances, the short-range communication subsystem 114b receives incoming audio data associated with an ongoing voice call. For example, the short-range communication subsystem 114b may receive the incoming audio data from the wireless terminal 102 and provide the audio data to the two-way audio interface 108. The two-way audio interface 108 can include a speaker that converts the audio data to acoustic information for a user. In some instances, the short-range communication subsystem 114b receives outgoing audio data associated with an ongoing voice call. For example, the two-way audio interface 108 can include a microphone that converts acoustic information to audio data, and the short-range communication subsystem 114b may receive the audio data and convert it to an appropriate signal and wirelessly transmit the signal to another device.

In some instances, the wireless terminal 102 wirelessly communicate directly with audio appliance 103. For example, the wireless signaling subsystem 112a of the wireless terminal 102 may wirelessly communicate directly with the wireless signaling subsystem 112b of the audio appliance 103; or the short-range communication subsystem 114a of the wireless terminal 102 may wirelessly communicate directly with the short-range communication subsystem 114b of the audio appliance 103. In some implementations, the wireless terminal 102 and the audio appliance 103 can communicate directly with each other by additional or different techniques and hardware.

In some implementations, the wireless terminal 102 can wirelessly communicate indirectly with audio appliance 103. For example, in some instances, a wireless interface of the wireless terminal 102 can communicate with a wireless interface of the audio appliance 103 indirectly, for example, through a router, a hub, a relay, a gateway, or another type of intermediary component or device. As a specific example, in some implementations the wireless terminal 102 and the audio appliance 103 can communicate with each other indirectly over a data network or a telecommunications network.

In one aspect of operation, the wireless terminal 102 places or receives a voice call carried by the wireless network 104. During the voice call, the wireless terminal 102 detects proximity of the audio appliance 103 based on an interaction between the wireless signaling subsystems 112a, 112b. In response to detecting proximity of the audio appliance 103, the wireless terminal 102 can exchange signaling information with the audio appliance 103 by the wireless signaling link 113. In some cases, the wireless terminal 102 determines, based on the signaling information received from the audio appliance 103, that the audio appliance 103 is permitted to carry an audio portion of the ongoing call. The wireless terminal 102 can then establish the wireless data link 115 between the short-range communication subsystems 114a, 114b. The wireless data link 115 can be used to transfer audio data for the ongoing call.

Accordingly, for the duration of the call, the wireless terminal 102 conducts the call with the wireless network 104, and the wireless terminal 102 routes an audio portion of the call through the audio appliance 103. The wireless data link 115 can be terminated at the end of the voice call, or the wireless data link 115 can persist beyond the end of the voice call.

FIG. 2 is a schematic diagram of an example wireless terminal 200. For example, the wireless terminal 200 can be a BLACKBERRY® telecommunication device and/or another type of mobile telecommunication device. In some implementations, the wireless terminal 200 is a dual-mode device. The example wireless terminal 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a Bluetooth subsystem 222, a Near Field Communication (NFC) subsystem 223, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The wireless terminal 200 can include the same, additional, or different features, which may be arranged or configured to operate in the manner shown or in a different manner.

The example wireless terminal 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the wireless terminal 200. Additionally or alternatively, the wireless terminal 200 may receive power from an external source (e.g., an alternating current power source, an adapter, a converter, etc.) and/or a different type of internal power source.

The example wireless terminal 200 shown in FIG. 2 can operate as a two-way communication device having voice and data communication capabilities. The wireless terminal 200 can communicate over a wireless network. For example, the wireless terminal 200 may communicate over the wireless network 104 shown in FIG. 1, or different or different types of wireless networks. Thus, the wireless terminal 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. In some implementations, the wireless network utilize one or more communication protocol standards, for example, 3G, 4G, GSM, CDMA, GPRS, EDGE, LTE or others.

In the example wireless terminal 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 can be used to communicate with a network. The DSP 260 can be used to receive and send signals through the receiver 250 and the transmitter 252, respectively, and the DSP 260 can provide control information to the receiver 250 and the transmitter 252. For example, the gain levels applied to communication signals in the receiver 250 and the transmitter 252 can be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 includes a single local oscillator that provides a reference signal for the receiver 250 and the transmitter 252, for example, where voice and data communications occur at a single frequency, or closely-spaced sets of frequencies. In some cases, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the wireless terminal 200 to and from the communication subsystem 204 through a link or bus between the DSP 260 and the microprocessor 202. The design and configuration of the communication subsystem 204, such as frequency band, component selection, power level, etc., may depend on the communication network in which the wireless terminal 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the wireless terminal 200 may send and receive communication signals, including both voice and data signals, over the wireless network 104. Signals received by the antenna 254 from the communication network can be routed to the receiver 250, which can provide signal amplification, frequency down conversion, filtering, channel selection, etc., and may also provide analog to digital signal conversion. Analog to digital conversion of the received signal may allow the resulting digital signal to be decoded by the DSP 260. Signals to be transmitted to the network can be processed (e.g., modulated, encoded, etc.) by the DSP 260 and then provided to the transmitter 252 for digital to analog conversion, frequency up conversion, filtering, amplification and transmission to the communication network via the antenna 256.

In some implementations, the wireless terminal 200 can send and receive communication signals over the wireless network 104 after wireless network registration or activation procedures have been completed. The wireless network registration or activation procedures for the wireless terminal 200 may vary based on the type of network or networks with which the wireless terminal 200 operates. Wireless network access for the example wireless terminal 200 shown in FIG. 2 can be associated with a subscriber or user of the wireless terminal 200. In particular, the SIM/RUIM card 226 in the SIM/RUIM interface 228 may identify the subscriber or user of the wireless terminal 200. The SIM/RUIM card 226 in the SIM/RUIM interface 228 may enable access to subscribed services through the wireless network 104. For example, subscribed services may include web browsing, e-mail, voice mail, Short Message Service (SMS), Multimedia Messaging Services (MMS), and/or others. The SIM/RUIM card 226 in the SIM/RUIM interface 228 can communicate with the microprocessor 202 on the wireless terminal 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the wireless terminal 200. The wireless terminal 200 may be manually synchronized with a host system, for example, by connecting the wireless terminal 200 through the data port 214 (e.g., in an interface cradle and/or another type of wired connection) that couples the wireless terminal 200 to a data port of a computer system or other device. The data port 214 may also be used to enable a user to set preferences through an external device or software application, or to download other programs for installation. The wired connection of the data port 214 may be used to load an encryption key onto the device.

The Bluetooth subsystem 222 and the NFC subsystem 223 each provide communication between the wireless terminal 200 and different systems or devices, without the use of the wireless network 104. For example, the Bluetooth subsystem 222 and the NFC subsystem 223 can include radio frequency devices and associated circuits and components for short-range communication. The wireless terminal 200 can include additional or different types of short-range communication subsystems. For example, the wireless terminal 200 can include an infrared communication subsystem, a WiFi communication subsystem, or another type of short-range communication subsystem. In some implementations, one or more of the short-range communication subsystems can be configured according to one or more standards or other types of specifications. Examples of short-range communication standards include standards developed by the Infrared Data Association (IrDA), BLUETOOTH®, the 802.11 family of standards developed by IEEE, the NFC Forum, and others.

The Bluetooth subsystem 222 can include, for example, a controller module, a transceiver module, an antenna, or any suitable combination of these and other components. The Bluetooth subsystem 222 can be configured to send and receive messages according to any appropriate standard or specification for Bluetooth-enabled devices. In some implementations, the Bluetooth subsystem 222 can be configured to communicate by wireless signals having one or more frequencies in a range of 2400 MHz to 2480 MHz, or in another frequency range. The Bluetooth subsystem 222 can be configured to communicate with other Bluetooth-enabled devices.

The NFC subsystem 223 can include, for example, a controller module, a transceiver module, an antenna, or any suitable combination of these and other components. The NFC subsystem 223 can be configured to send and receive messages according to any appropriate standard or specification for NFC devices. In some implementations, the NFC subsystem 223 can be configured to communicate by wireless signals having one or more frequencies at or near 13.56 MHz, or in another frequency range. The NFC subsystem 223 can be configured to detect proximity of NFC tags and other NFC-enabled devices. The NFC subsystem 223 can be configured to communicate with NFC-enabled devices, for example, in response to detecting their proximity or in response to other events or criteria.

The example microprocessor 202 can manage and control the overall operation of the wireless terminal 200. Many types of microprocessors or microcontrollers may be used, as appropriate. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 can interact with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the Bluetooth subsystem 222, the NFC subsystem 223, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the wireless terminal 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the wireless terminal 200 may include user application data, text files, image files, voicemail data, and other data generated by the user at the wireless terminal 200 or received and stored by the wireless terminal 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the wireless terminal 200 by the user.

The operating system 234 can control low-level functions of the wireless terminal 200 and facilitate operation of the programs 236. For example, the operating system 234 may provide an interface between one or more of the programs 236 and one or more hardware components on the wireless terminal 200. The programs 236 include computer program modules that can be executed by the microprocessor 202 (and/or the DSP 260 in some instances). In some implementations, one or more of the programs 236 are executed by the microprocessor 202 and provide a high-level interface between a user and the wireless terminal 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which may be installed on the wireless terminal 200 during its manufacture and/or initial configuration. Other types of software applications, such as, for example, third party applications and/or other types of modules, may be added after the manufacture and initial configuration of the wireless terminal 200. Examples of third party applications include games, utilities, internet applications, etc. Generally, any of the programs 236 may be updated and/or modified at any time. The additional applications and/or updates to applications can be loaded onto the wireless terminal 200 through the wireless network 104, the auxiliary I/O devices 212, the data port 214, the Bluetooth subsystem 222, the NFC subsystem 223, or any other suitable device subsystem 224. The non-volatile memory 208 may also store keys, which may include encryption and decryption keys and addressing information for use in communicating between the wireless terminal 200 and servers.

Figure 3:
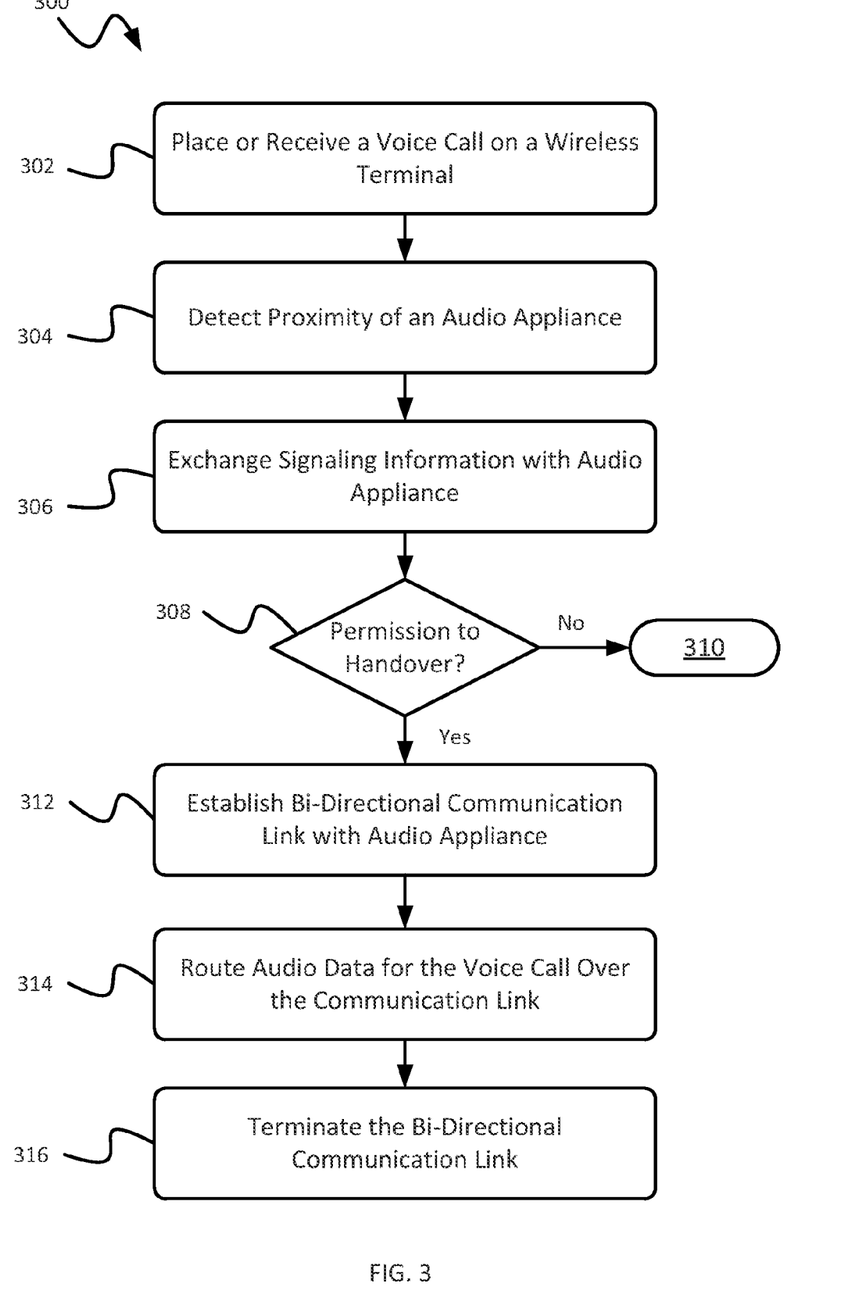
FIG. 3 is a flow diagram showing an example technique for transferring a call.

FIG. 3 is a flow diagram showing an example process 300 for transferring a call. The process 300 can be implemented in a communication system. For example, the process 300 can be implemented by one or more components of the communication system 100 shown in FIG. 1 or by a different type of system. In some cases, the process 300 is executed by a wireless terminal (e.g., the wireless terminal 102 of FIG. 1, the wireless terminal 200 of FIG. 2, etc.) or another type of mobile device. Some or all aspects of the process 300 may be executed by additional or different types of devices or subsystems.

In some implementations, aspects of the example process 300 are executed by a wireless terminal that can communicate wirelessly with an audio appliance. As an example, the wireless terminal can be a telecommunication handset, and the audio appliance can be a speakerphone system. Both devices (the wireless terminal and the audio appliance) can each include two or more wireless interfaces. For example, both devices can include an NFC interface and another wireless interface (e.g., Bluetooth, WiFi, infrared, optical, etc.). The two wireless interfaces of each device can be configured to transmit wireless signals in different frequency ranges, for example, using different types of hardware. The process 300 can be executed by devices or systems that include additional or different features or components, as appropriate.

The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

At 302, a voice call is placed or received on a wireless terminal. For example, the wireless terminal can initiate the call or receive the call based on wireless communication with a wireless network. In some instances, the voice call is initiated or answered at the wireless terminal in response to a user interaction.

At 304, proximity of an audio appliance is detected. For example, the wireless terminal can detect proximity of the audio appliance by wireless interactions with the audio appliance, contact with the audio appliance, or other factors. Proximity of the audio appliance can be detected during the ongoing voice call. In some instances, proximity is detected at the wireless terminal by signals wirelessly transmitted from the audio appliance to the mobile device. For example, the signals can include infrared signals, visible light signals, Gigahertz signals, radio frequency signals, or other types of wireless signals.

In some implementations, proximity is detected based on physical proximity of the two devices and possibly other criteria. For example, the wireless terminal may detect proximity of the audio appliance in response to the audio appliance moving within a detection range (e.g., 4 cm, 10 cm, 20 cm, etc.) of the wireless terminal. In some cases, the wireless terminal detects proximity of the audio appliance by a proximity-activated wireless interface of the wireless terminal. For example, the proximity-activated wireless interface can be an NFC interface, or another type of interface.

At 306, signaling information is exchanged with the audio appliance. For example, the wireless terminal may send signaling information to the audio appliance and receive additional signaling information from the audio appliance. The signaling information can be exchanged during the ongoing voice call. The signaling information can be exchanged over one or more wireless links between the wireless terminal and the audio appliance. For example, the signaling information can be exchanged over an NFC link or another type of radio frequency link, an optical link, an infrared link, or any suitable combination of these and other types of communication links. In some instances, the signaling information is exchanged using the same interface of the wireless terminal that was used to detect proximity of the audio appliance (at 304). In some cases, some or all of the signaling information is presented as a bar code on a display of the audio appliance, and the wireless terminal receives the signaling information by scanning the bar code.

The signaling information can include any information that allows the wireless terminal to determine whether the audio appliance is permitted to carry an audio portion of the voice call. In some cases, the signaling information includes an identity for the wireless terminal, an identity for a user associated with the wireless terminal, an identity for the audio appliance, an identity for a user associated with the audio appliance, a cryptographic certificate, authentication challenge/response information, or a combination of these and other types of information.

At 308, a determination is made whether there is permission to handover an audio portion of the call to the audio appliance. For example, the wireless terminal can determine whether the audio appliance is permitted to carry the audio portion of the voice call. The wireless terminal can make the determination during an ongoing voice call. In some instances, the audio appliance determines whether the wireless terminal is permitted to transfer the call to the audio appliance.

The determination of whether there is permission to handover the audio portion of the call can be made based on the signaling information. For example, the wireless terminal may determine whether the audio appliance is permitted to carry the audio portion of the call based on an identifier for the audio appliance, a location of the audio appliance, a user associated with the audio appliance, or other information. In some cases, the wireless terminal sends a challenge value to the audio appliance, and the wireless terminal determines whether the audio appliance is permitted to carry the audio portion of the call based on a response value received from the audio appliance. For example, the audio appliance may be denied permission unless it replies with the correct response for the challenge that was sent.

In some cases, the wireless terminal authenticates the audio appliance based on a cryptographic certificate. For example, the signaling information received by the wireless terminal may include one or more cryptographic certificates associated with the audio appliance. The cryptographic certificate can be issued by a trusted third party, such as a certificate authority. The cryptographic certificate can be an implicit certificate, an explicit certificate, or another type of digital certificate. Examples of cryptographic certificates include X.509 certificates, Elliptic Curve Qu Vanstone (ECQV) implicit certificates, and others. Generally, a digital certificate certifies a particular public key associated with a device or user entity, and may also certify that the device or user entity has possession of a private key corresponding to the certified public key. In some examples, the wireless terminal determines that the audio appliance is permitted to carry the audio portion of the call based on verifying that the audio appliance has a valid digital certificate issued by a trusted certificate authority.

If there is not permission to handover the audio portion of the call at 308, the process 300 proceeds to 310. At 310, the process 300 may terminate, restart, or continue in another manner. For example, in some cases, the wireless terminal can make another attempt to handover the call, exchange additional signaling information, or perform other operations. In some cases the wireless terminal can continue carrying the audio portion of the ongoing voice call.

If there is permission to handover the audio portion of the call at 308, the process 300 proceeds to 312. At 312, a bi-directional communication link is established with the audio appliance. For example, the bi-directional communication link can be established to transfer audio data between the mobile device and the audio appliance. The bi-directional communication link can be established during the ongoing voice call. The bi-directional communication link can include one or more wireless links between the wireless terminal and the audio appliance. For example, the bi-directional communication link can be a Bluetooth link or another type of radio frequency link, a 60 GHz link, an optical link, an infrared link, or any suitable combination of these and other types of communication links. The bi-directional communication link can include data or other information (e.g., cryptographic keys, addressing information, identifiers, etc.) stored at the wireless terminal and used to generate messages exchanged between the wireless terminal and the audio appliance. In some implementations, the bi-directional communication link established at 308 provides faster data transfer, more secure data transfer, or both, as compared to the communication link that was used to detect proximity of the audio appliance (at 304) or the communication link that was used to exchange the signaling information (at 306).

In some cases, the bi-directional communication link can be established based at least in part on a handover protocol. In some implementations, the handover protocol between two devices is executed in whole or in part based on data exchanged between the devices over a wireless link. For example, the handover protocol can be executed over an NFC link between two devices to establish a Bluetooth link between the same two devices.

In some implementations, a handover protocol can include a handover request message, a handover selection message, or any suitable combination of these and other messages and operations. The handover request message can include a request to communicate over an alternative carrier. The handover request can include an identification of available alternative carriers, such as, for example, Bluetooth, WiFi, or another type of carrier. The handover selection message can identify an alternative carrier selected by one of the devices. For example, the handover selection can identify that one of the devices has agreed to communicate by Bluetooth, by WiFi, or by another alternative carrier. An example handover protocol that includes a handover request and a handover selection is described in the Connection Handover Technical Specification published by the NFC Forum (see, e.g., Connection Handover 1.2, dated Jul. 7, 2010). A handover can be executed based on additional or different techniques.

In some cases, the bi-directional communication link can be established based at least in part on a pairing protocol. Some wireless connections, such as Bluetooth, WiFi, and others, utilize a pairing protocol with some level of security to protect against eavesdropping. When two devices execute the paring protocol, a shared secret can be established between the devices. Accordingly, a shared secret can be established between the wireless terminal and the audio appliance based at least partially on a Bluetooth, WiFi, or another type pairing protocol. In some cases, the pairing protocol establishes the shared secret based on a key agreement protocol. For example, the key agreement protocol can use one or more cryptographic certificates to establish a shared secret. Example key agreement protocols include the Diffie-Hellman key agreement protocol, the Elliptic Curve Menezes Qu Vanstone (EC MQV) key agreement protocol, the HMQV key agreement protocol, and others.

At 314, audio data for the voice call is routed over the communication link. For example, the audio data can be routed between the mobile device and the audio appliance over the bi-directional communication link. The audio data can be routed during the ongoing voice call. In some implementations, the audio data is routed by signals wirelessly transmitted between the audio appliance and the wireless terminal. The signals can include, for example, infrared signals, visible light signals, 60 Gigahertz signals, radio frequency signals, or any suitable combination of these and other types of wireless signals. In some instances, the audio data can be routed by the interface that was used to detect proximity of the audio appliance (at 304), or by a different interface. In some instances, the audio data can be routed by the same interface that was used to exchange signaling information with the audio appliance (at 306), or by a different interface.

At 316, the bi-directional communication link is terminated. For example, the bi-directional communication link can be terminated in response to termination of the voice call. In some cases, the bi-directional communication link is terminated during the ongoing voice call, for example, in response to a user request, low signal strength, or another event or condition. In some cases, the bi-directional communication link persists after termination of the voice call. For example, the bi-directional communication link can be terminated at a later time, for example, after a certain amount of time, in response to a user request, low signal strength, or another event or condition.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. A computing device typically includes a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a call is transferred to an audio appliance. For example, a mobile device conducting an ongoing call can enable the audio appliance to handle an audio portion of the ongoing call.

In some aspects, during a voice call, a mobile device detects proximity of an audio appliance. The mobile device determines that the audio appliance is permitted to carry an audio portion of the voice call. The mobile device establishes a bi-directional communication link operable to transfer audio data between the mobile device and the audio appliance.

Implementations of these and other aspects can include one or more of the following features. Determining that the audio appliance is permitted to carry the audio portion of the voice call includes exchanging signaling information between the mobile device and the audio appliance. The signaling information includes an identity for the mobile device, an identity for a user associated with the mobile device, an identity for the audio appliance, an identity for a user associated with the audio appliance, a cryptographic certificate, authentication challenge/response information, or any suitable combination. Determining that the audio appliance is permitted to carry the audio portion of the voice call includes authenticating the audio appliance based on a cryptographic certificate. Determining that the audio appliance is permitted to carry the audio portion of the voice call includes the mobile device scanning a bar code presented on a display component of the audio appliance.

Additionally or alternatively, implementations of these and other aspects can include one or more of the following features. The proximity is detected by the mobile device based at least in part on signals wirelessly transmitted from the audio appliance to the mobile device. The signals include infrared signals, visible light signals, 60 Gigahertz signals, radio frequency signals, or any suitable combination. The mobile device is a telecommunication handset wirelessly connected to a telecommunication network that carries the voice call. The proximity is detected by a Near Field Communication (NFC) interface of the mobile device. The audio appliance includes a speakerphone. The bi-directional communication link is terminated in response to termination of the voice call.

Additionally or alternatively, implementations of these and other aspects can include one or more of the following features. The audio data for the voice call are routed between the mobile device and the audio appliance by the bi-directional communication link. The audio data are routed by signals wirelessly transmitted between the audio appliance and the mobile device. The signals include infrared signals, visible light signals, 60 Gigahertz signals, radio frequency signals, or any suitable combination. The audio data are routed by a Blueooth interface of the mobile device. The proximity is detected by a wireless interface of the mobile device, and the audio data is routed by the same wireless interface. The interface includes an infrared interface, a visible light interface, a radio frequency interface, or any suitable combination.

In some aspects, a mobile device includes a wireless communication subsystem and a wireless signaling subsystem. The wireless communication subsystem is operable to conduct a voice call by communicating with a wireless telecommunication network. The wireless signaling subsystem is operable to detect proximity of an audio appliance during an ongoing voice call, determine that the audio appliance is permitted to carry an audio portion of the ongoing voice call, and establish a bi-directional communication link operable to transfer audio data between the mobile device and the audio appliance.

Implementations of these and other aspects can include one or more of the following features. The mobile device includes a short-range wireless communication subsystem. Establishing the bi-directional communication link enables the short-range wireless communication subsystem to communicate with the audio appliance. The short-range wireless communication subsystem is operable to route the audio data for the ongoing voice call between the mobile device and the audio appliance. The short-range wireless communication subsystem includes an infrared interface, an optical interface, a 60 GHz interface, a radio frequency interface, or any suitable combination. The short-range communication subsystem includes a Bluetooth interface.

Additionally or alternatively, implementations of these and other aspects can include one or more of the following features. The wireless signaling subsystem includes an infrared interface, an optical interface, a radio frequency interface, or any suitable combination. The wireless signaling subsystem includes a Near Field Communication (NFC) interface. The wireless signaling subsystem includes data processing apparatus and a transceiver module.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for transferring a call, the method comprising:
    detecting proximity of an audio appliance during a voice call on a mobile device;
    receiving a cryptographic certificate from the audio appliance, wherein the cryptographic certificate certifies a public key associated with the audio appliance;
    authenticating the audio appliance based on the cryptographic certificate;
    determining, based on the authenticating, that the audio appliance is permitted to carry an audio portion of the voice call; and
    establishing a bi-directional communication link operable to transfer audio data between the mobile device and the audio appliance based at least in part on a handover protocol, wherein establishing the bi-directional communication link comprises:
        selecting a carrier for the audio data; and
        transmitting a handover request message that identifies the selected carrier.

2. The method of claim 1, wherein determining that the audio appliance is permitted to carry the audio portion of the voice call comprises exchanging signaling information between the mobile device and the audio appliance.

3. The method of claim 2, wherein the signaling information includes at least one of:
    an identity for the mobile device;
    an identity for a user associated with the mobile device;
    an identity for the audio appliance;
    an identity for a user associated with the audio appliance;
    a cryptographic certificate; or
    authentication challenge/response information.

4. The method of claim 1, wherein determining that the audio appliance is permitted to carry the audio portion of the voice call comprises the mobile device scanning a bar code presented on a display component of the audio appliance.

5. The method of claim 1, wherein the proximity is detected by the mobile device based at least in part on signals wirelessly transmitted from the audio appliance to the mobile device, the signals comprising at least one of infrared signals, visible light signals, 60 Gigahertz signals, or radio frequency signals.

6. The method of claim 1, further comprising routing the audio data for the voice call between the mobile device and the audio appliance by the bi-directional communication link.

7. The method of claim 6, wherein the audio data is routed by signals wirelessly transmitted between the audio appliance and the mobile device, the signals comprising at least one of infrared signals, visible light signals, 60 Gigahertz signals, or radio frequency signals.

8. The method of claim 6, wherein the proximity is detected by a Near Field Communication (NFC) interface of the mobile device, and the audio data is routed by a Blueooth interface of the mobile device.

9. The method of claim 6, wherein the proximity is detected by a wireless interface of the mobile device, and the audio data is routed by the wireless interface of the mobile device.

10. The method of claim 9, wherein the interface includes at least one of an infrared interface or a visible light interface.

11. The method of claim 1, wherein the mobile device comprises a telecommunication handset wirelessly connected to a telecommunication network that carries the voice call, and the audio appliance comprises a speakerphone.

12. The method of claim 1, further comprising terminating the bi-directional communication link in response to termination of the voice call.

13. A mobile device comprising:
    a communication subsystem operable to conduct a voice call by communicating with a wireless telecommunication network;
    a wireless signaling subsystem operable to perform operations comprising:
        detecting proximity of an audio appliance during an ongoing voice call;
        receive a cryptographic certificate from the audio appliance, wherein the cryptographic certificate certifies a public key associated with the audio appliance;
        authenticate the audio appliance based on the cryptographic certificate
        determining, based on the authenticating, that the audio appliance is permitted to carry an audio portion of the ongoing voice call; and
        establishing a bi-directional communication link operable to transfer audio data between the mobile device and the audio appliance based at least in part on a handover protocol, wherein establishing the bi-directional communication link comprises:
            selecting a carrier for the audio data; and
            transmitting a handover request message that identifies the selected carrier.

14. The mobile device of claim 13, further comprising a short-range wireless communication subsystem, wherein establishing the bi-directional communication link enables the short-range wireless communication subsystem to communicate with the audio appliance.

15. The mobile device of claim 14, wherein the short-range wireless communication subsystem is operable to route the audio data for the ongoing voice call between the mobile device and the audio appliance.

16. The mobile device of claim 14, wherein the short-range wireless communication subsystem includes at least one of an infrared interface, an optical interface, a 60 GHz interface, or a radio frequency interface.

17. The mobile device of claim 14, wherein the short-range communication subsystem includes a Bluetooth interface.

18. The mobile device of claim 13, wherein the wireless signaling subsystem includes at least one of an infrared interface, an optical interface, or a radio frequency interface.

19. The mobile device of claim 13, wherein the wireless signaling subsystem includes a Near Field Communication (NFC) interface.

20. The mobile device of claim 13, wherein the wireless signaling subsystem includes data processing apparatus and a transceiver module.

21. The mobile device of claim 13, wherein determining that the audio appliance is permitted to carry the audio portion of the ongoing voice call comprises the mobile device scanning a bar code presented on a display component of the audio appliance.

22. A non-transitory computer-readable medium storing instructions that are operable when executed by data processing apparatus to perform operations for transferring a call, the operations comprising:
  detecting proximity of an audio appliance during a voice call on a mobile device;
  receiving a cryptographic certificate from the audio appliance, wherein the cryptographic certificate certifies a public key associated with the audio appliance;
  authenticating the audio appliance based on the cryptographic certificate
  determining, based on the authenticating, that the audio appliance is permitted to carry an audio portion of the voice call; and
  establishing a bi-directional communication link operable to transfer audio data between the mobile device and the audio appliance based at least in part on a handover protocol, wherein establishing the bi-directional communication link comprises:
    selecting a carrier for the audio data; and
    transmitting a handover request message that identifies the selected carrier.

23. The computer-readable medium of claim 22, wherein determining that the audio appliance is permitted to carry the audio portion of the voice call comprises exchanging signaling information between the mobile device and the audio appliance.

24. The computer-readable medium of claim 23, wherein the signaling information includes at least one of:
  an identity for the mobile device;
  an identity for a user associated with the mobile device;
  an identity for the audio appliance;
  an identity for a user associated with the audio appliance;
  a cryptographic certificate; or
  authentication challenge/response information.

25. The computer-readable medium of claim 22, wherein determining that the audio appliance is permitted to carry the audio portion of the voice call comprises the mobile device scanning a bar code presented on a display component of the audio appliance.

26. The computer-readable medium of claim 22, wherein the proximity is detected by the mobile device based at least in part on signals wirelessly transmitted from the audio appliance to the mobile device, the signals comprising at least one of infrared signals, visible light signals, 60 Gigahertz signals, or radio frequency signals.

27. The computer-readable medium of claim 22, the operations further comprising routing the audio data for the voice call between the mobile device and the audio appliance by the bi-directional communication link.

28. The computer-readable medium of claim 22, wherein the mobile device comprises a telecommunication handset wirelessly connected to a telecommunication network that carries the voice call, and the audio appliance comprises a speakerphone.

29. The computer-readable medium of claim 22, the operations further comprising terminating the bi-directional communication link in response to termination of the voice call.

* * * * *